United States Patent
Theobald (10) Patent No.: US 9,764,675 B1
(45) Date of Patent: Sep. 19, 2017

(54) ITEM MANIPULATING AND GATHERING METHOD

(71) Applicant: Daniel Theobald, Somerville, MA (US)

(72) Inventor: Daniel Theobald, Somerville, MA (US)

( * ) Notice: Subject to any disclaimer, the term of this patent is extended or adjusted under 35 U.S.C. 154(b) by 0 days.

(21) Appl. No.: 14/501,166

(22) Filed: Sep. 30, 2014

(51) Int. Cl.
*B25J 15/00* (2006.01)
*B25J 15/06* (2006.01)
*B60P 1/48* (2006.01)

(52) U.S. Cl.
CPC ............ *B60P 1/48* (2013.01); *B25J 15/00* (2013.01); *B25J 15/0616* (2013.01)

(58) Field of Classification Search
CPC ........... B60P 1/48; B65J 15/00; B65J 15/0616
See application file for complete search history.

(56) References Cited

U.S. PATENT DOCUMENTS

| | | | | |
|---|---|---|---|---|
| 4,411,574 A * | 10/1983 | Riley | ...................... | B65B 21/20 198/432 |
| 4,767,143 A * | 8/1988 | Michael | ............... | B65G 47/914 294/65 |
| 5,207,553 A * | 5/1993 | Konagai | ...................... | 414/737 |
| 5,632,590 A * | 5/1997 | Pearson | ............... | B25J 15/0616 294/907 |
| 6,345,818 B1 * | 2/2002 | Stephan | ............... | B25J 15/0052 271/106 |
| 6,394,519 B1 * | 5/2002 | Byers | ................... | B25B 11/002 248/683 |
| 6,979,032 B2 * | 12/2005 | Damhuis | .......................... | 294/65 |
| 7,611,180 B1 * | 11/2009 | Fisher | .................. | B25J 15/0052 294/65 |
| 8,606,398 B2 * | 12/2013 | Eakins | ................... | B25J 9/1687 700/117 |
| 8,696,043 B2 * | 4/2014 | Regan | .................. | B25J 15/0675 294/188 |
| 9,010,827 B2 * | 4/2015 | Regan | .................. | B25J 15/0675 294/188 |
| 9,031,697 B2 * | 5/2015 | Huang | ..................... | B25J 5/005 414/730 |
| 9,205,558 B1 * | 12/2015 | Zevenbergen | ......... | B25J 9/1664 |
| 2010/0119413 A1 * | 5/2010 | Rizzotte | ............... | B25J 15/0253 422/63 |

(Continued)

FOREIGN PATENT DOCUMENTS

EP WO2013124319 * 8/2013 ............. B65B 43/30

*Primary Examiner* — Michael McCullough
*Assistant Examiner* — Ashley Romano
(74) *Attorney, Agent, or Firm* — Albert J. Brunett (57) ABSTRACT

A method of gathering at least one item from an area is provided. The method includes providing at least one grasping mechanism for capturing at least one item, gathering information regarding a first item, including information regarding the first item's orientation in the area, and determining whether the grasping mechanism is able to capture the first item from the area based on the information regarding the first item's orientation. The method further includes manipulating, via the grasping mechanism, the first item if necessary based on the information regarding the first item's orientation to ensure the first item is in an orientation in which the grasping mechanism is able to capture the first item from the area, and capturing the first item with the grasping mechanism and moving the first item to another area.

3 Claims, 7 Drawing Sheets

(56) References Cited

U.S. PATENT DOCUMENTS

| | | | |
|---|---|---|---|
| 2014/0144470 A1* | 5/2014 | Sewell | B01F 3/04503 134/18 |
| 2014/0205403 A1* | 7/2014 | Criswell | B25J 5/007 414/395 |
| 2015/0032252 A1* | 1/2015 | Galluzzo | B25J 5/007 700/218 |
| 2015/0033677 A1* | 2/2015 | Vaucher et al. | 53/492 |
| 2015/0037131 A1* | 2/2015 | Girtman | B25J 15/0052 414/797 |
| 2015/0063973 A1* | 3/2015 | Girtman | B25J 9/0093 414/796.9 |
| 2015/0066199 A1* | 3/2015 | Shimono | B65G 59/04 700/218 |

* cited by examiner

ITEM MANIPULATING AND GATHERING METHOD

BACKGROUND OF THE INVENTION

Field of the Invention

The present invention generally relates to methods for gathering items from an area.

Background Information

Items may need to be gathered from areas for a number of reasons. Often times, however, methods used to gather items may require the items to be in a certain position or orientation before the items can be gathered.

SUMMARY OF THE INVENTION

A method of gathering at least one item from an area is provided. The method includes providing at least one grasping mechanism for capturing at least one item, gathering information regarding a first item, including information regarding the first item's orientation in the area, and determining whether the grasping mechanism is able to capture the first item from the area based on the information regarding the first item's orientation. The method further includes manipulating, via the grasping mechanism, the first item if necessary based on the information regarding the first item's orientation to ensure the first item is in an orientation in which the grasping mechanism is able to capture the first item from the area, and capturing the first item with the grasping mechanism and moving the first item to another area.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DESCRIPTION OF THE PREFERRED EMBODIMENTS

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Certain terminology is used herein for convenience only and is not to be taken as a limitation on the present disclosure. In the drawings, the same reference letters are employed for designating the same elements throughout the figures.

The present invention is generally related to a method for gathering at least one item from an area. The method may include providing a grasping mechanism (or any other type of mechanism or the like) that may be configured as part of a vehicle and may be autonomous or operated by a human operator. In the context of this invention, the term "item" may refer to boxes, crates, containers, packages, barrels, canisters, luggage, chests, bags, or any other type of tangible item or the like.

These types of items or the like may need to be gathered from a first area and be moved or otherwise transported to a second area. This second area may be on a vehicle, in which case the vehicle may then transport the item(s) to another area for further shipment, packaging, or use.

In accordance with the features of the invention, the grasping mechanism may be capable of manipulating an item so that it is easier to capture (e.g., move) the item from the area. The ability to manipulate items before capturing an item provides a significant degree of flexibility. For example, an item doesn't need to be in a specific orientation with respect to the mechanism (e.g., with a side of the item directly facing the mechanism) beforehand.

Items are also not required to be placed in a specific position in an area beforehand. For example, the items do not need to be positioned directly on the edge of a shelf or other surface in order for the mechanism to ensure a successful grip with the item, as the mechanism can first move the item accordingly.

Similarly, the mechanism can first "grab" and move other items that may be blocking a specific item. As stated previously, this provides a significant degree of flexibility as items do not need to be placed or organized in any specific way beforehand.

Another feature of the present invention is that human operators are not required to manually move, position, orient, or gather the items themselves. This inevitably saves time and mitigates risk of injury to human operators.

The grasping mechanism may also include a securing device movable between a first position preferably used during loading of the item onto the mechanism, and a second position to secure the item on the mechanism. When in the second position, the securing device may be in operable contact with a surface of the item, essentially providing a compressive force so that the item is secured.

With the securing device securing the item, there is a greater force required to displace or otherwise move the item from the mechanism. If the grasping mechanism is configured as part of a vehicle, for example, this may allow the vehicle to continue traveling as the grasping mechanism moves an item between areas (e.g., between a shelf and the vehicle) and therefore saves time and energy.

The features of the invention may be advantageous in applications such as warehouse environments for shipping/receiving items. In this type of application, items frequently need to be gathered and transported to locations for storage, use, or further shipment.

For example, in a warehouse environment, items may be located on various shelves throughout the warehouse. A vehicle (configured with the mechanism) may be tasked to travel throughout the warehouse to gather certain items. The grasping mechanism may gather these items from their respective locations and place them on the vehicle which may then transport these items to another location.

Similarly, military and other shipping services may benefit from the features of the invention, as well as any other type of operations in which items need to be gathered and/or moved to certain areas. Other types of logistic operations may include applications in health care facilities, hospitality resorts, correctional facilities, and retail stores. This list is merely exemplary, and applicant contemplates a wide variety of applications that may benefit from the features of the invention.

Figure 1:
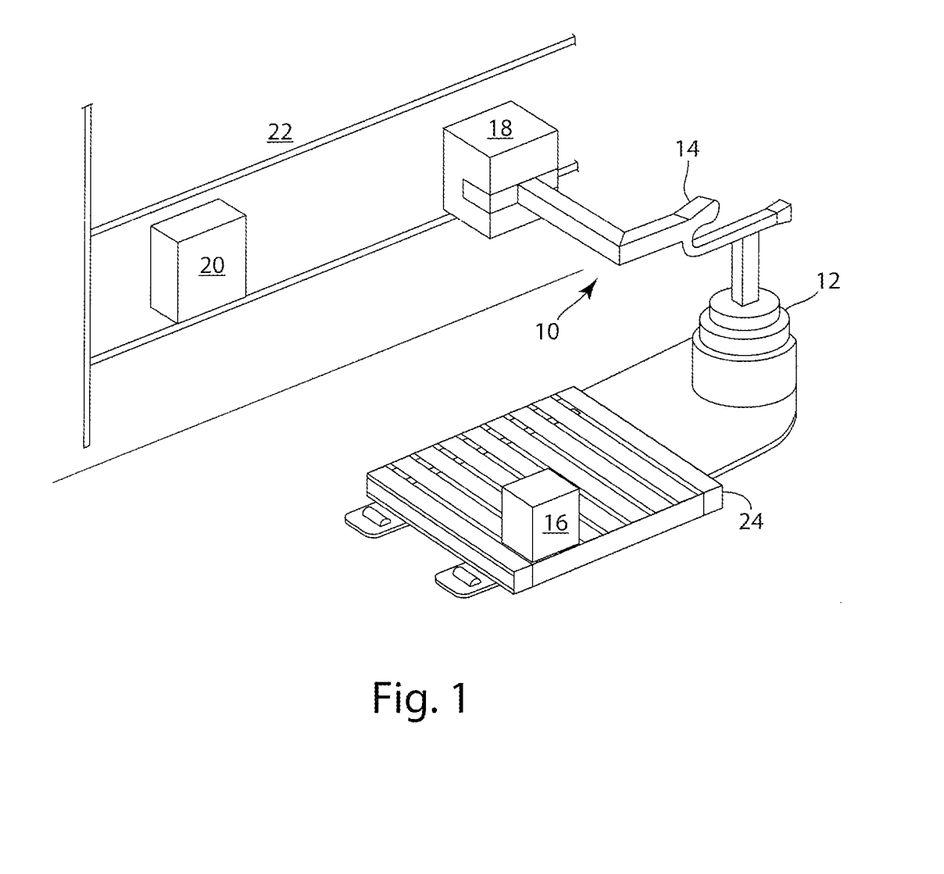
FIG. 1 generally illustrates the mechanism configured as part of a vehicle in accordance with one embodiment of the invention.

FIG. 1 generally illustrates one configuration of the grasping mechanism 10 (hereinafter "mechanism") in which the mechanism 10 is configured as part of a vehicle 12. In this configuration, the mechanism 10 may be in the form of a robotic arm member 14 operably attached to the vehicle 12.

Briefly, in operation, the vehicle 12 may be tasked to gather an item or items 16, 18, 20 from an area such as a shelf 22. The mechanism 10 may first gather information (e.g., via sensor devices, not shown but discussed below) regarding an item to be gathered 18, such as the item's orientation.

The mechanism 10 may then determine whether it is able to capture the item from the shelf 22 based on at least the item's orientation. If the mechanism 10 is unable to capture the item, the mechanism 10 may first manipulate the item to ensure the mechanism 10 can successfully capture the item from the area.

Once the mechanism 10 is able to capture the item, the mechanism 10 may move the item 18 from the shelf 22 and place the item 18 onto a portion of the vehicle 12. For example, and as generally illustrated in FIG. 1, the mechanism 10 may place the items on a pallet device 24 positioned on the vehicle 12.

Figure 2:
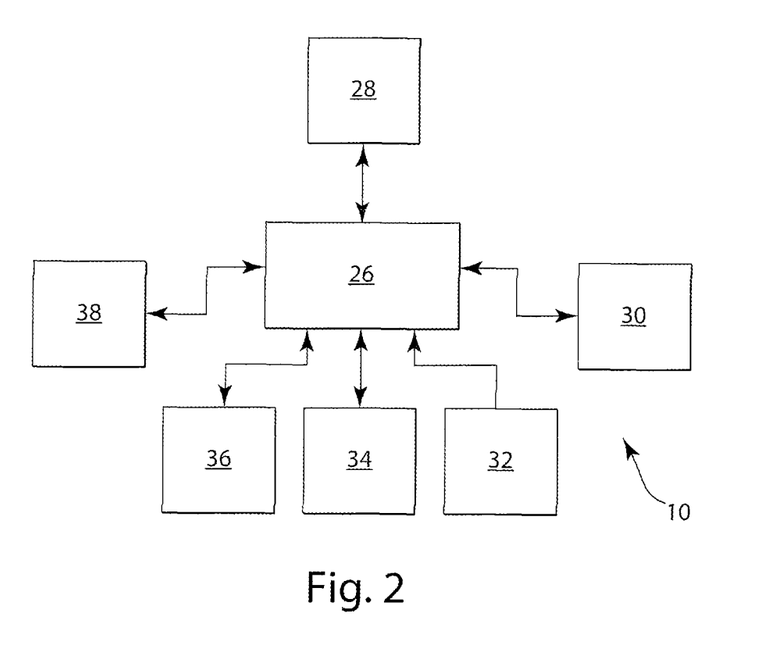
FIG. 2 generally illustrates a block diagram of the mechanism in accordance with one embodiment of the invention.

FIG. 2 generally illustrates a block diagram of the components of the mechanism 10 in accordance with one embodiment of the invention. If the mechanism 10 is fully autonomous, the mechanism may include a control device 26 implemented using hardware or a combination of hardware and software. The control device 26 may include one or more processing devices, analog and/or digital circuitry, and be in operable communication with other components such as an item manipulating device 28, a sensor system 30, a receiver element 32, memory 34, a user interface 36, and a power source 38.

As stated previously, the mechanism 10 may be used in a variety of applications and configurations. For example, the mechanism 10 may be configured as part of a vehicle and capable of autonomous operation, operated by a human operator, configured as part of an aerial vehicle, a stationary structure, or mounted in any other configuration.

The item manipulating device 28 may include suction devices, electromagnets, nails, Velcro®, hooks, fasteners, winches, clasps or any other type of means to selectively connect and disconnect with an item. The number of components of the item manipulating device 28 may vary, as long as an item can manipulated as desired.

The sensor system 30 may include any type of sensor device that can gather information regarding the environment surrounding the mechanism 10, such as items' locations and orientations, and communicate that information to the control device 26 to control the item manipulating device 28 accordingly. For example, the sensor system 30 may include camera devices such as those described in detail in applicant's allowed patent application Ser. No. 12/626,990, entitled "System for Providing Camera Views" the disclosure of which is hereby incorporated by reference.

The sensor system 30 may also include global positioning (GPS) sensors, 3D cameras (e.g., LIDAR), infrared cameras, stereoscopic cameras, inertial sensors, odometric sensors, radar, electro-acoustic transducers (microphones), or other types of devices that assist the mechanism 10 in surveying and navigating within its environment. The number of, type of, and positions of the sensor devices of the sensor system 30 may vary as long as the features of the invention can be accomplished.

The receiver element 32 may receive commands via a wireless connection from a central computing device (not shown). For example, the receiver element 32 may receive a list of items to be gathered, as well as information regarding the items' locations, weights, volumes, shapes, destinations, contents, and other characteristics.

The memory 34 may be configured to store software such as instructions for execution by the control device 26. The memory 34 may include volatile and/or non-volatile memory, and may also be configured to store information regarding the environment such as where certain items are located, along with other characteristics mentioned previously.

A user interface 36 may be used and configured to receive and/or output instructions or commands to or from an operator (such as a list of items to be gathered). The interface 36 may include an input/output (I/O) device such as a display screen or a touch pad. The user interface 36 may also configured separately from the mechanism 10, such as on a vehicle.

The power source 38 may be configured to supply power to the control device 26 and other components of the mechanism 10. The power source 38 may include, for example, a battery or a series of batteries, rechargeable batteries, battery packs, or the like.

Figure 3:
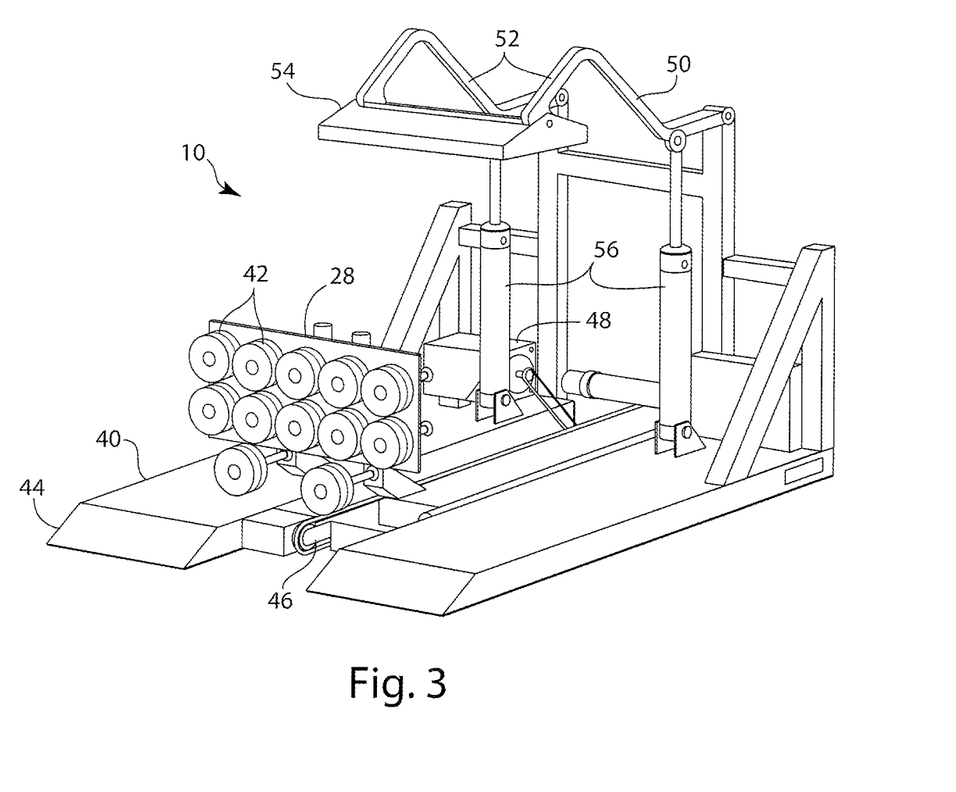
FIG. 3 generally illustrates a perspective view of the mechanism in accordance with one embodiment of the invention.
Figure 4:
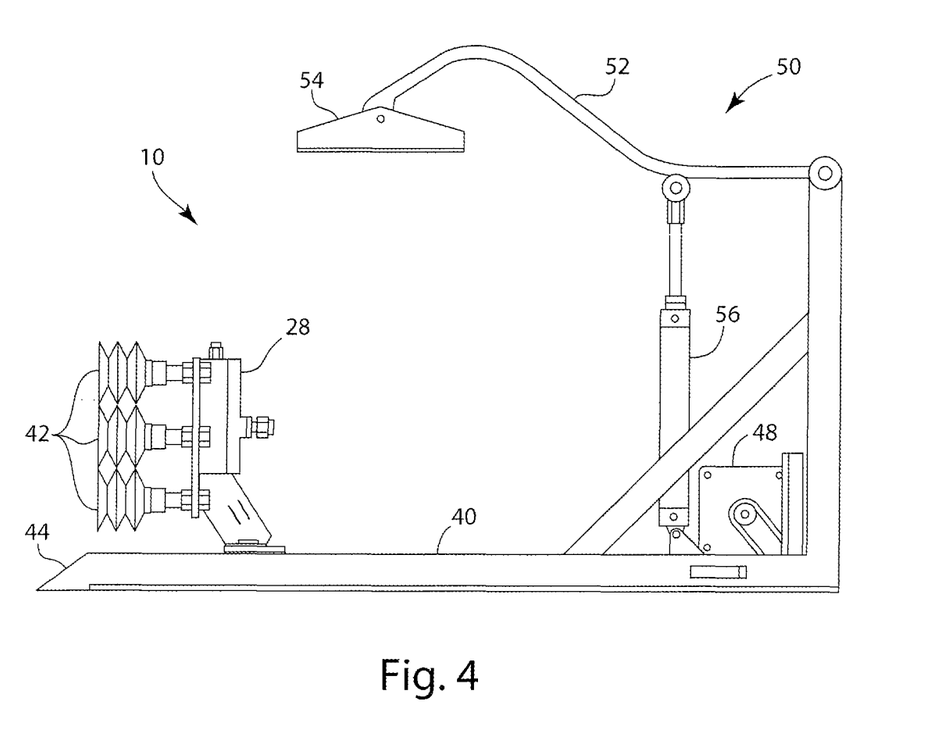
FIG. 4 generally illustrates a side view of the mechanism in accordance with one embodiment of the invention.

FIGS. 3 and 4 generally illustrate perspective and side views, respectively, of the mechanism 10 in accordance with one embodiment of the invention. As can generally be seen, the mechanism 10 in this embodiment may include a support surface 40 and an item manipulating device 28 with suction devices 42. The support surface 40 is generally illustrated as a flat portion for holding items, and may include a ramp portion 44 to facilitate the loading and unloading of items.

The support surface 40 may also include a track portion 46 for enabling movement of the item manipulating device 28, discussed below. The support surface 40 may also include load cells (not shown) to detect the presence of items on the support surface 40, for example, and then communicate that information to the control device 26. The configuration of the support surface 40 may vary as long as the features of the invention can be accomplished.

In this embodiment, the item manipulating device 28 includes a plurality of suction devices 42 that may be, and as illustrated in FIGS. 3 and 4, perpendicular with the support surface 40. These suction devices 42 may be operably connected to a generator device, a pump device, and valve devices (not shown) to each provide a lifting force and to selectively connect with and manipulate an item. The configuration may of course vary as long as items can be gathered in accordance with the features of the invention.

The item manipulating device 28 may also be connected to a movement device 48 to control movement of the item manipulating device 28 along the track portion 46. The movement device 48 may include a motor, a system of mechanical gears, hydraulic actuators, pneumatic actuators, or the like.

The mechanism 10 in this embodiment may also include a securing device 50 to secure an item on the support surface 40 and include arm members 52, a clamping portion 54, and actuator components 56. Once the load cells of the support surface 40 detect an item on the support surface 40 and signal the control device 26, for example, the control device 26 may then signal the actuator components 56 to contract and secure the item.

Figure 5:
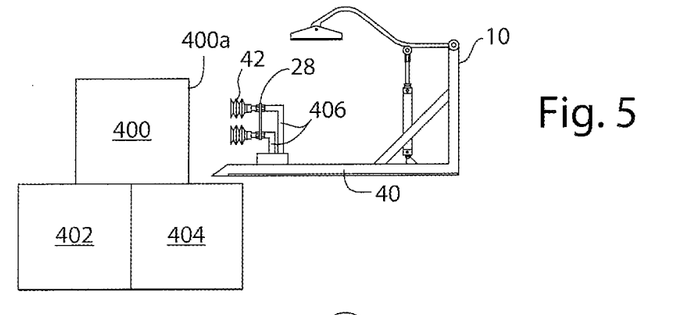
FIG. 5 generally illustrates the mechanism approaching an item in accordance with one embodiment of the invention.
Figure 6:
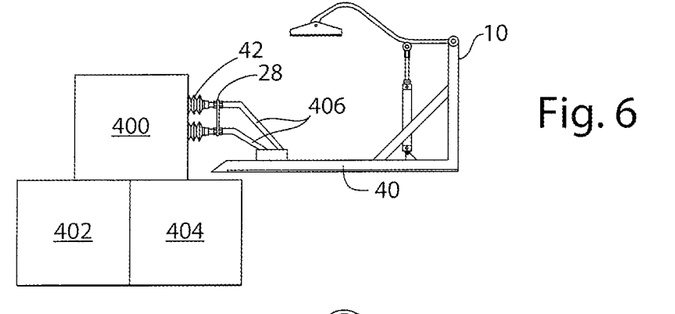
FIG. 6 generally illustrates the mechanism connecting with an item in accordance with one embodiment of the invention.
Figure 7:
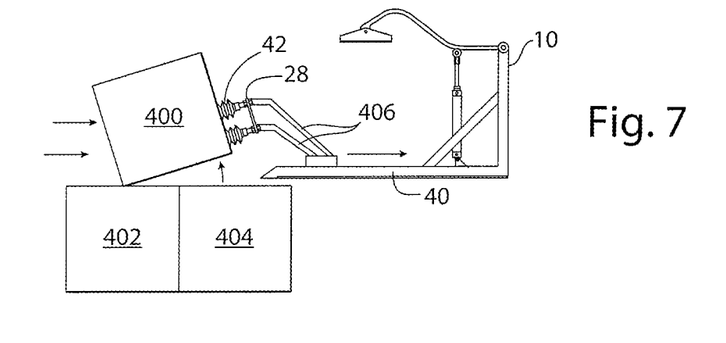
FIG. 7 generally illustrates the mechanism tilting an item for extraction in accordance with one embodiment of the invention.

FIGS. 5-7 generally illustrate the mechanism 10 of FIGS. 3 and 4 capturing an item 400 from an area. Item 400 may be resting on items 402 and 404, for example. Note in FIGS. 5-7, for simplicity, the mechanism 10 is not illustrated as being configured as part of a vehicle or being operated by a human operator (but see FIGS. 1 and 12, respectively).

In FIG. 5, the mechanism 10 is generally seen as approaching item 400. While FIG. 5 generally shows the side face 400a of item 400 directly facing the mechanism 10 (namely, the suction devices 42) the features of the invention enable the mechanism 10 to gather items even if the items are not oriented in a specific way (e.g., not facing the mechanism 10 directly).

FIG. 6 generally illustrates the item manipulating device 28 (namely, the suction devices 42) extending towards and "grabbing" the item 400. The item manipulating device 28 may include sets of extension mechanisms 406 to essentially control movement of the suction devices 42 to connect with item 400. The extension mechanisms 406 may be actuation mechanisms that can be passive, active, spring loaded, or be of any other configuration whether available now or invented hereafter as long as it can move the suction devices 42 as desired.

Once connected with the item 400, and as generally seen in FIG. 7, the item manipulating device 28 may orient (e.g., tilt) the item 400. Once the item 400 is in this tilted position, and still connected with the item manipulating device 28, the item manipulating device 28 may move along the support surface 40 to essentially pull the item 400 onto the support surface 40.

As can readily be seen, tilting the item 400 allows for an easier transition of moving the item 400 from its initial location onto the support surface 40. Tilting the item may also reduce the overall fiction applied to the items during movement. Also, the ability to move (slide) an item will not depend much on the geometry of the surfaces of the items.

Another advantage of tilting an item is that the mechanism 10 does not need to be positioned or aligned in any specific way before gathering the item. For example, the mechanism 10 of FIGS. 5-7 does not need to rest on item 404 or have the support surface 40 directly in line with (or below) the bottom surface of the item 400.

It is also contemplated that, depending on the initial position of an item, the item manipulating device 28 may connect with an item without requiring extension mechanisms to extend or otherwise move the suction devices 42. For example, the suction devices 42 may connect with an item while remaining in the position generally illustrated in FIG. 5 and move the item accordingly (e.g., to first ensure a successful grip on an item before moving the item onto the support surface 40).

Figure 8:
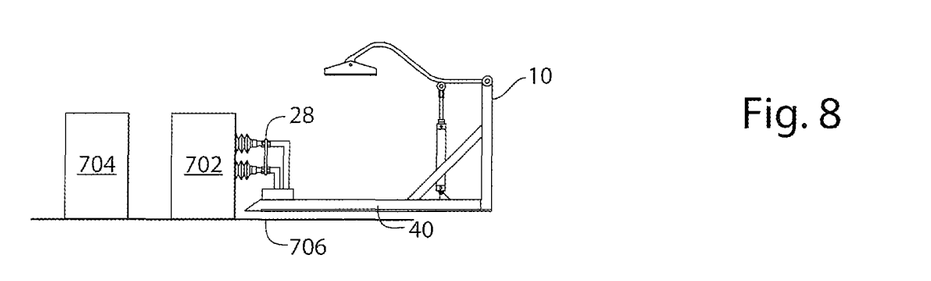
FIG. 8 generally illustrates the mechanism connecting with an item in accordance with another embodiment of the invention.

FIGS. 8-11 generally illustrate this embodiment and show the mechanism 10 capturing an item by first moving the item to ensure a successful grip and extraction. FIG. 8 generally illustrates the mechanism 10 in operable contact with a first item 702 that is, along with a second item 704, positioned on a shelf 706.

Due to the position of the first item 702 on the shelf 706, the support surface 40 may be unable to be positioned underneath (below) the first item 702. This may cause the first item 702 to collide with the mechanism 10 (namely, the support surface 40) if extraction is attempted.

Figure 9:
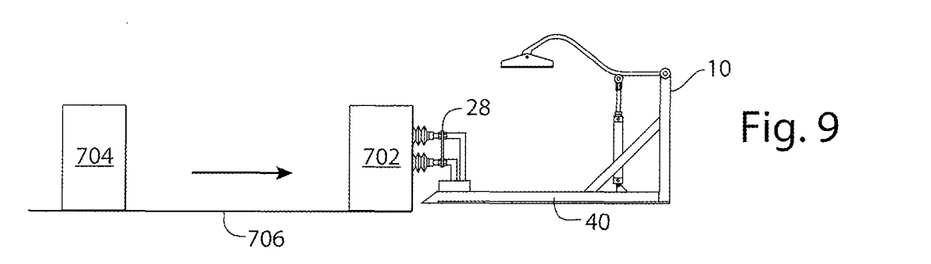
FIG. 9 generally illustrates the mechanism positioning an item in accordance with one embodiment of the invention.
Figure 10:
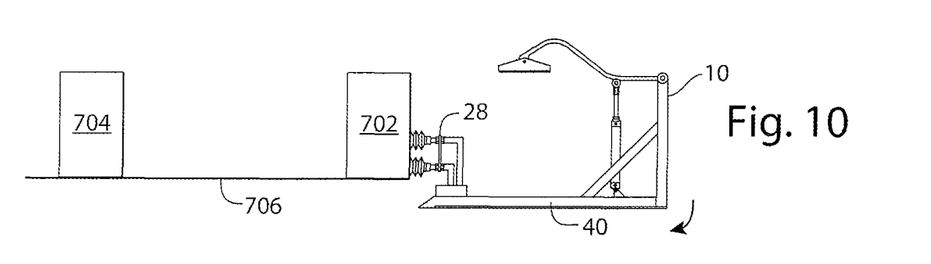
FIG. 10 generally illustrates the mechanism connecting with an item in accordance with another embodiment of the invention.

In FIG. 9, the mechanism 10 is generally seen as moving (pulling) the first item 702 towards the edge of the shelf 706 as generally indicated by the arrow. The mechanism 10 (i.e., the item manipulating device 28) may temporarily disconnect from the first item 702 and then, in FIG. 10, move so the support surface 40 is essentially "underneath" the first item 702.

Figure 11:
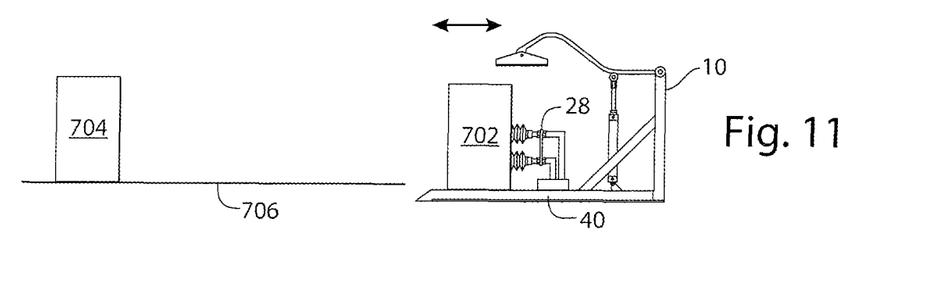
FIG. 11 generally illustrates an item being pulled onto the mechanism in accordance with another embodiment of the invention.

In FIG. 11, the item manipulating device 28 may then, after reconnecting with the first item 702, pull the first item 702 onto the support surface 40. Because the mechanism 10 was able to move the first item 702 and then be positioned underneath the first item 702, the first item 702 can be easily pulled onto the support surface 40 without colliding with the support surface 40.

Similarly, the mechanism 10 may move the first item 702 along the shelf 706 to reach the second item 704 more easily. Or, the mechanism 10 may position items on a surface (such as the pallet device 24 of FIG. 1) to make room for other, incoming items, for example.

Referring back to FIGS. 3 and 4, the arm members 52 may be maneuvered by actuator components 56 that may be operably attached to the support surface 40 and the arm members 52. The actuator components 56 may be hydraulic or pneumatic actuators, for example.

Although actuator components are illustrated, other types of components may be used to similarly manipulate the arm members 52. For example, the mechanism 10 may include a system of motorized tracks and gears to operably manipulate the arm members 52. Any other technique, whether available now or invented hereafter, may be used to manipulate the arm members 52 as long as an item can be secured.

With the arm members 52, clamping portion 54, and actuator components 56, the securing device 50 can accommodate items of varying sizes and shapes. This provides significant flexibility which may be desired in environments in which different types of items may need to be transported and secured during transportation.

Figure 12:
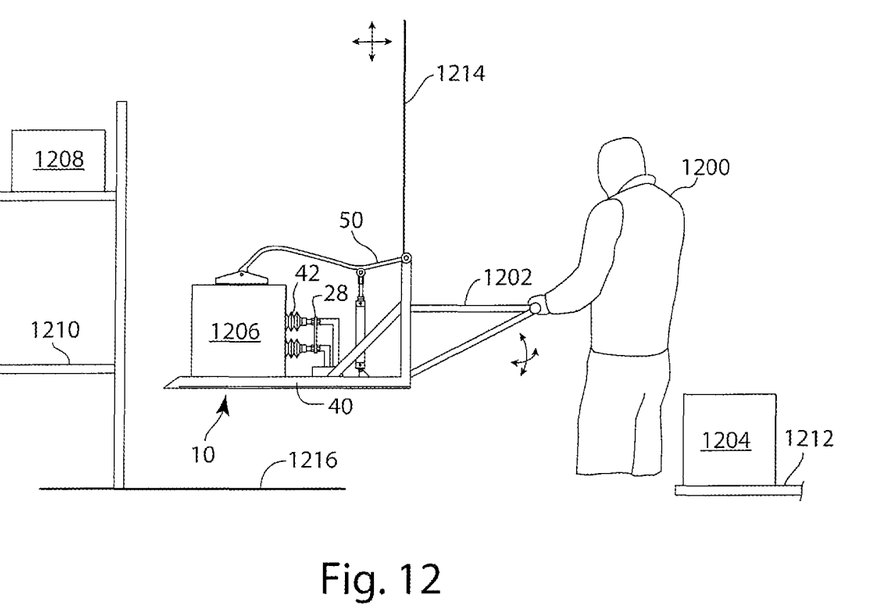
FIG. 12 generally illustrates the mechanism being operated by a human operator in accordance with one embodiment of the invention.

FIG. 12 generally illustrates another configuration of the mechanism 10 of FIGS. 3 and 4 in which the mechanism 10 is operated by a human operator 1200 and includes a handle device 1202. The operator 1200 may be an employee in a warehouse, for example, who is tasked to gather and move items 1204, 1206, and 1208 from a location such as a shelf 1210 to another location such as a pallet device 1212.

In this embodiment, the mechanism 10 may be at least vertically maneuvered by a cable 1214 that may be attached to a pulley device (not shown). While the support surface 40 is shown as being substantially parallel with the floor 1216, the mechanism 10 may be maneuvered with several degrees of freedom, including to an orientation in which the support surface 40 is not parallel with the floor 1216. This may be due to inadvertent maneuvering by the operator 1200, or to better enable an item to be gathered from or placed on a high or low surface.

Also shown is the item manipulating device 28 after the item 1206 has been gathered and the securing device 50 in a securing position. The securing device 50, in combination with the support surface 40, essentially provides a compressive force that acts on the top and bottom surfaces of the item 1206. In this embodiment, the item manipulating device 28 and the securing device 50 may be controlled by the operator 1200 or they may be operated autonomously.

Also, the forces of the securing device may act on the top and bottom surfaces of the item, rather than on the sides. This is beneficial with certain types of items, such as boxes, in which the top and bottom surfaces of the box may be rated for higher forces (as opposed to the sides of the boxes, which are generally not rated for high forces and therefore are more likely to be damaged by compressive forces).

Although the description above contains many specific examples, these should not be construed as limiting the scope of the embodiments of the present disclosure but as merely providing illustrations of some of the preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

I claim:

1. A method for operating an autonomous mobile robot for autonomously gathering at least one first desired item in an area and autonomously moving the item to another location, comprising:

providing a fully autonomous mobile robot capable of autonomously navigating around a designated area;

providing a grasping mechanism with the mobile robot that can autonomously grasp and move the first desired item from a first location in the designated area;

providing sensors with the mobile robot to autonomously at least gather information regarding an initial orientation of the first desired item as it is positioned in the first location;

determining autonomously whether the grasping mechanism is capable of grasping the first desired item in the initial orientation provided in the first position;

determining autonomously a second specific orientation of the first desired item based upon whether the grasping mechanism can grasp the first desired item and whether the first desired item can be reoriented from the initial orientation to the second orientation without experiencing interference from any other objects;

operating the grasping mechanism autonomously to manipulate the first desired item based upon the determinations made in the previous step to the second orientation to enable the grasping mechanism to autonomously grasp the first desired item positioned in the second orientation;

operating the grasping mechanism to autonomously capture the first desired item based upon whether the first desired item is positioned in one of the initial orientation and the second orientation;

operating the mobile robot to autonomously move the first desired item from the first location to the second location;

operating the sensors to determine autonomously the appropriate position at the second location to place the first desired item; and operating the grasping mechanism to release the first desired item at the second location.

2. The method as defined in claim 1, including determining autonomously whether another second item is blocking the grasping of the first desired item, determining autonomously where the second item can be moved to so that the first desired item can be grasped and operating the grasping mechanism to move the second item to another location so the grasping mechanism can then grasp or move the first desired item.

3. The method as defined in claim 1, including securing the first desired item to the mobile robot autonomously during transport by the mobile robot from the first location to the second location.

* * * * *